(12) United States Patent
Ostlund

(10) Patent No.: US 8,297,829 B2
(45) Date of Patent: Oct. 30, 2012

(54) MOBILE DEVICE WITH ILLUMINATION

(75) Inventor: Petter Ostlund, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 352 days.

(21) Appl. No.: 12/352,723

(22) Filed: Jan. 13, 2009

(65) Prior Publication Data

US 2010/0177531 A1 Jul. 15, 2010

(51) Int. Cl.
*F21V 7/04* (2006.01)

(52) U.S. Cl. .................... 362/615; 362/231; 362/311.01

(58) Field of Classification Search .................. 362/23, 362/24, 27, 615, 628, 97.1, 97.3, 231, 618, 362/624, 577, 583, 511, 109, 293, 311.01
See application file for complete search history.

(56) References Cited

U.S. PATENT DOCUMENTS

| | | | | |
|---|---|---|---|---|
| 5,237,607 | A | | 8/1993 | Diamantis |
| 5,266,817 | A | * | 11/1993 | Lin .................................. 257/89 |
| 5,408,060 | A | * | 4/1995 | Muurinen ..................... 200/314 |
| 5,542,016 | A | | 7/1996 | Kaschke |
| 5,746,493 | A | * | 5/1998 | Jonsson et al. ................ 362/602 |
| 6,310,609 | B1 | * | 10/2001 | Morgenthaler ............... 345/170 |
| 6,577,359 | B2 | * | 6/2003 | Ishihara .......................... 349/63 |
| 7,477,340 | B2 | * | 1/2009 | Lee ................................. 349/65 |
| 2002/0175057 | A1 | * | 11/2002 | Swanson ....................... 200/5 A |
| 2003/0095104 | A1 | * | 5/2003 | Kandogan et al. ............ 345/168 |
| 2003/0099166 | A1 | * | 5/2003 | Chan et al. ................. 369/30.17 |
| 2003/0210780 | A1 | | 11/2003 | Pratt et al. |
| 2007/0086782 | A1 | * | 4/2007 | Schilling et al. .............. 398/141 |
| 2007/0126011 | A1 | * | 6/2007 | Lee ................................. 257/89 |
| 2007/0166091 | A1 | * | 7/2007 | Griffin .......................... 400/486 |
| 2008/0253070 | A1 | | 10/2008 | Rissanen et al. |
| 2008/0253202 | A1 | | 10/2008 | Yu et al. |
| 2010/0142183 | A1 | * | 6/2010 | Lerenius ......................... 362/85 |

FOREIGN PATENT DOCUMENTS

| | | |
|---|---|---|
| EP | 1 724 951 | 11/2006 |
| WO | 2004/098078 A1 | 11/2004 |
| WO | 2007/113604 | 10/2007 |

OTHER PUBLICATIONS

Fiber Bragg Gratings Lab: Design and Fabrication of Advanced Fibre Bragg Gratings, Acreo, Part of Swedish ICT, 2004.

* cited by examiner

*Primary Examiner* — Danielle Allen
(74) *Attorney, Agent, or Firm* — Peter F. Corless; Steven M. Jensen; Edwards Wildman Palmer LLP

(57) ABSTRACT

A mobile device is provided comprising a light guide modified at a plurality of locations to let light guided in the light guide at least partially escape. Furthermore, methods and apparatuses for manufacturing such mobile devices are provided.

15 Claims, 1 Drawing Sheet

MOBILE DEVICE WITH ILLUMINATION

FIELD OF THE INVENTION

The present invention relates to mobile devices, parts of which may be illuminated by one or more light sources within the mobile device. The present invention relates also to manufacturing methods and manufacturing apparatuses for such devices.

BACKGROUND OF THE INVENTION

Mobile, i.e. portable devices, for example mobile phones, personal digital assistants (PDAs), digital cameras, portable gaming devices, music players or laptop computers, are conveniences increasingly used in daily life. In recent years, the functionality of such mobile devices increased by incorporating a plurality of different functions. For example, modern mobile phones often have digital cameras, organizer functions, music player functions, radio functions and/or gaming functions integrated.

Mobile devices like the ones above sometimes have illumination devices integrated therein to illuminate parts of the mobile device. For example, keypads of mobile phones often may be illuminated to enable a user to operate the mobile phone under poor lighting conditions or even in darkness. Conventionally, for such an illumination a light source, for example a light emitting diode, may be provided below each key of the keypad, or a larger light source may be provided for all keys of the keypad. In this case, for example electrostatic discharge by a user handling the mobile device may adversely affect or even destroy the functionality of such light sources.

SUMMARY OF THE INVENTION

According to an embodiment, a mobile device is provided, comprising:
at least one light source configured to emit light in the visible range,
a light guide coupled to said light source configured to guide light emitted by said at least one light source through said mobile device,
wherein said light guide is modified at a plurality of locations to let at least part of the light guided within the light guide escape at said locations.

According to an embodiment, the mobile device may further comprise a plurality of elements to be illuminated, wherein each element of said plurality of elements is associated with at least one location of said plurality of locations.

According to an embodiment, at least one element of said plurality of elements may be selected from the group consisting of a key, a button, a joystick and an area of the mobile device.

According to an embodiment, at least two locations of said plurality of locations may be configured to let light of different wavelength ranges escape from the light guide.

According to an embodiment, said at least one light source may comprise at least two light sources having different wavelengths.

According to an embodiment, said at least one light source may comprise a light emitting diode.

According to an embodiment, said light guide may comprise a material selected from the group consisting of a plastic material and a glass material.

According to an embodiment, at least one location of said plurality of locations said light guide may comprise a modification, said modification being selected from the group consisting of a removal of material from an outer layer of the light guide, a removal of material of a core layer of the light guide, a modification of material according to a predetermined pattern and a removal of material according to a predetermined pattern.

According to an embodiment, the mobile device may further comprise a light transmitter configured to couple light modulated depending on data to be transmitted into said light guide and a light receiver coupled to said light guide configured to receive said modulated light and demodulate said light to retrieve said data.

According to an embodiment, said modulated light may have a wavelength in the infrared range.

According to an embodiment, said mobile device may be selected from the group consisting of a mobile phone, a gaming device, a personal digital assistant, a laptop computer and a music player.

According to another embodiment, a method of manufacturing a mobile device is provided, comprising:
providing a light guide,
structuring said light guide such that light guided in the light guide is allowed to escape the light guide at a plurality of predetermined locations, and
incorporating the light guide in a mobile device.

According to an embodiment, said providing a light guide may comprise providing said light guide coupled with a carrier element, and wherein said incorporating said light guide in said mobile device comprises incorporating said light guide together with said carrier element in said mobile device.

According to an embodiment, said structuring may comprise irradiating said light guide with a laser beam.

According to a further embodiment, an apparatus for manufacturing a mobile device is provided, comprising:
a laser,
a diffractive optical element configured to receive a laser beam from said laser and to guide a modified laser beam onto a light guide to create a location in said light guide where light guided in said light guide may escape the light guide,
wherein said light guide is to be incorporated into a mobile device for illuminating parts thereof.

According to an embodiment, said diffractive optical element may be selected from the group consisting of a holographic diffractive optical element, an axicon, a Bragg grating and an acousto-optical module.

DETAILED DESCRIPTION OF THE INVENTION

Figure 1A:
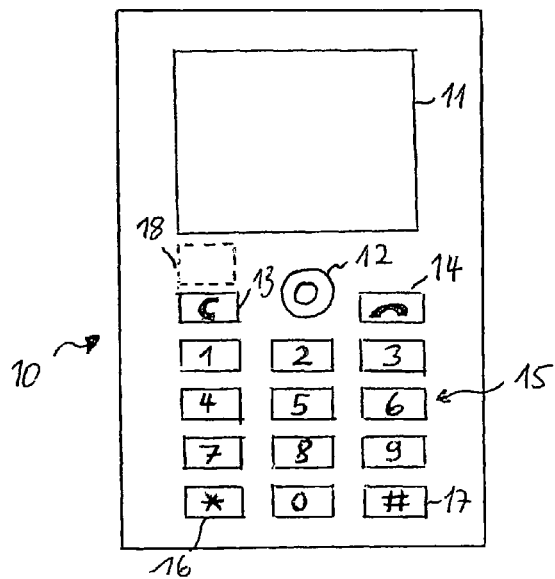
FIG. 1A shows a top view of a mobile device according to an embodiment.

In the following, embodiments of the present invention will be described in detail with reference to the attached drawings. It is to be noted that the embodiments described hereinafter are merely intended to illustrate the present invention and are not be construed as limiting the scope thereof.

It is to be understood that in the following description of embodiments, any direct connection or coupling between functional blocks, devices, components, circuit elements or other physical or functional units shown in the drawings or described herein, i.e. any connection without intervening elements, could also be implemented by an indirect connection or coupling, i.e. a connection or coupling with one or more additional intervening elements.

Furthermore, it should be appreciated that the partitioning of embodiments into functional blocks or units shown in the drawings or described herein is not to be construed as indicating that these units necessarily are implemented physically separate.

It is to be understood that features of various embodiments described hereinafter may be combined with each other unless specifically noted otherwise.

Furthermore, it is to be understood that describing an embodiment comprising a plurality of elements is not to be construed as indicating that all these elements are necessary for practising the present invention. Instead, in other embodiments, only some of such elements may be present. Furthermore, additional elements not explicitly described may be provided.

It is to be noted that any directional terminology like "top", "bottom", "left" or "right" used in the following detailed description is merely used for easy reference to certain portions of the drawings and is not to be construed as limiting the actual positioning of elements of embodiments in implementations thereof.

In the following, embodiments of the present invention will be described in detail.

The embodiments described in the following use light guides. A light guide, in the context of this application, is generally to be understood as a device capable of guiding light from a location where light is generated by one or more light sources to a different location where the light is used. In particular, as light guides waveguides for light may be used. Such waveguides essentially make use of the principle that when a first material having a first refractive index is surrounded by a second material having a second refractive index lower than the first refractive index, light may be guided within the first material, since light incident on the interface between the first material and second material exceeding a predetermined angle, the angle measured with respect to an imaginary line perpendicular to the interface, is essentially totally reflected and therefore may be kept within the first material with small losses. The above-mentioned predetermined angle depends on the refractive indices of the first material and the second material and is sometimes referred to as total reflection angle.

Commonly used light guides of this sort are for example glass fibers. With simple glass fibers, the fiber itself consists only of a first material, the second material mentioned above being provided, for example, by air surrounding the fiber. More sophisticated glass fibers may comprise a plurality of layers from a center to an outside of the fiber which are usually concentrically arranged and have different refractive indices or varying refractive indices.

Other waveguides may comprise plastic materials embedded in other plastic materials or in air. Light guides need not have a fiber shape, but may also be implemented as planar waveguides, i.e. sheet-like waveguides sandwiched between other materials.

Turning now to the Figures, in FIG. 1A a schematic top view of a mobile device 10 according to an embodiment of the present invention is shown. In the embodiment of FIG. 1A, mobile device 10 is a mobile phone. Other embodiments may be implemented in the form of other mobile devices like digital cameras, laptop computers, portable music players, personal digital assistants (PDAs) or gaming devices. As already mentioned in the introductory portion, in some embodiments a mobile device may have a plurality of different functions, for example the function of a mobile phone and of a digital camera.

In the embodiment of FIG. 1A, mobile device 10 comprises a display 11, a joystick 12 and a keypad comprising a plurality of keys 13, 14, 15, 16, 17. Keys 13, 14, 16, 17 are function keys, while keys 15 are numerical keys for entering digits 0 to 9, for example for dialing a telephone number. Keys 15 may also serve for inputting text, for example for text to be used for a SMS message (short message system).

For example, in the embodiment shown key 13 is a key for initiating a call or for answering incoming calls, key 14 is a key for rejecting or terminating calls, key 16 is a star key and key 17 is a hash key, which are sometimes used for remote control purposes, for example when entering a pin code.

Joystick 12 may for example be used for navigation on screen 11.

The elements shown serve only as examples, and other elements or further elements, like additional keys or buttons, may be present.

Furthermore, the top side of mobile device 10 shown in FIG. 1A comprises an area 18 which is transparent or semi-transparent.

Figure 1B:
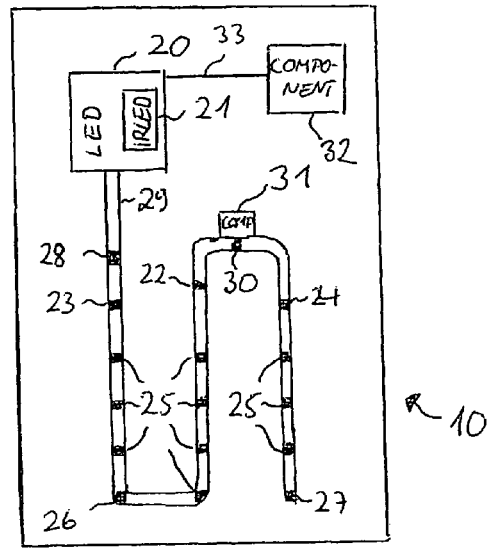
FIG. 1B shows a top view of some interior parts of the mobile device of the embodiment of FIG. 1A.

Turning now to FIG. 1B, a top view of the mobile device of FIG. 1A is shown with the cover removed such that an illumination system provided according to an embodiment of the present invention is visible. It should be noted that the components shown in FIG. 1B are not to be construed as indicating that only these components are present within mobile device 10. In contrast, in a mobile phone like mobile device 10, usually a plurality of further components are present, like communication circuitry, an antenna, a microphone, a loudspeaker, a sim card or a memory, just to name a few. These components correspond to components found in conventional mobile phones and are therefore not shown in FIG. 1B.

The illumination system shown in FIG. 1B comprises a light source 20 coupled with a light guide 29. Light source 20 may for example comprise one or more light emitting diodes (LEDs), for example LEDs of different colors like a red LED, a green LED and a blue LED. However, also other light sources than LEDs, for example lasers like semiconductor lasers or a light bulb may be used.

Light generated by light source 20 is coupled into light guide 29 and guided to an area where elements 12 to 18 of FIG. 1A are located to illuminate these elements.

Light guide 29 may for example be a glass fiber or a waveguide based on a plastic material as described above, or also a waveguide combining glass and plastic materials.

At a plurality of predetermined locations, light guide 29 is modified such that light escapes from the light guide at these locations to illuminate one or more elements associated with the respective location. Such locations in FIG. 1B comprise locations 22 to 28, wherein the reference numeral of the locations correspond to the reference numeral of the associated element of FIG. 1A plus 10. For example, location 23 is associated with key 13, and light escaping from light guide 29 at location 23 illuminates key 13. Likewise, location 22 is associated with joystick 12, location 24 is associated with key 14, locations 25 are associated with numerical keys 15, location 26 is associated with key 16, location 27 is associated with key 17 and location 28 is associated with area 18.

The locations for example may be generated by removing or modifying portions of light guide 29 at these locations, for example removing material from the light guide. Such a modification in some embodiments is performed by "writing"

on the light guide with a laser beam, which will be explained below with respect to FIGS. 2 and 3 in more detail.

Locations 22 to 28 may have the same or similar structures so as to have similar properties with respect to light escaping light guide 29. In other embodiments, the properties of different locations are different. For example, at the locations the light guide may be adapted to let light only of a specified wavelength range escape, and this wavelength range may be different for example for function keys associated with locations 22, 23, 24, 26 and 27 and for numeric keys associated with locations 25. As a result, for example function keys may be illuminated with red light, while numeric keys like numeric keys 15 of FIG. 1A may be illuminated with blue light or white light. In this respect, as already indicated above light source 20 may comprise one or more light emitting diodes to provide the desired colors, or may comprise e.g. a white light source.

Location 28 associated with area 18 in an embodiment may be adapted to let yet another wavelength range of light escape from waveguide 29 to provide yet another illumination color.

However, the above color variations are only examples, and basically any desired structure may be used at locations 22 to 28.

As explained above, in the embodiment of FIGS. 1A and 1B, light guide 29 is used to guide light from an illumination source 20 to locations 22 to 28 where it escapes the light guide and is used to illuminate elements 12 to 18 of mobile device 10.

Optionally, light guide 29 additionally may be used for communication between different components of mobile device 10. This communication may be effected by using light in a different wavelength range than visible light used for illumination, for example using infrared light. Infrared wavelengths sometimes used for communication via light guide are for example wavelengths around 1.55 µm or 1.3 µm, although other wavelengths may equally be used. As an illustrative example, in FIG. 1B components 32 and 31 are shown. Components 32 and 31 may comprise any kind of circuitry conventionally used in mobile devices like mobile phones. For example, component 32 may comprise a memory, and component 31 may comprise circuitry using information from said memory. In another embodiment, component 32 may comprise an antenna for receiving signals, and component 31 may comprise circuitry for processing such signals.

In the illustrative example of FIG. 1B, component 32 transmits signals via a connection 33, for example a wire based connection, to illumination source 20. Illumination source 20 in the example shown comprises an infrared light source 21, for example an infrared LED. Light emitted by infrared light source 21 is modulated depending on data received via connection 33 from component 32 and coupled into light guide 29. A location 30 is provided to let infrared light escape from the light guide so as to be received by component 31. Component 31 converts the received light into electrical signals, for example by using a photo diode or a photo transistor, and demodulates the signal to retrieve the data.

It should be noted that the arrangement shown in FIG. 1B serves only as an example, and numerous modifications are possible in other embodiments of the present invention. For example, while a single light guide 29 is shown in FIG. 1B which is used to provide illuminations for all elements 12 to 18 of FIG. 1A, in other embodiments more than one light guide may be present. In such a case, separate light guides may be provided for separate elements or groups of separate elements. For example, a first light guide may be provided for illuminating numerica keys like keys 15 of FIG. 1A, and a second light guide may be provided for illuminated function keys 13 to 17 of FIG. 1A. Also, for light of different colors different light guides may be provided, which may, but need not, run in parallel such as to selectively provide illuminations of different colors for some elements.

Moreover, while in the example of FIG. 1B a location 22 to 28 for each element 12 to 18 to be illuminated is provided, in other embodiments some elements may be illuminated jointly via a single location where light escapes the light guide.

Furthermore, regarding the use of light guides for communication between various components, while in the example of FIG. 1B component 32 uses illumination source 20, in particular infrared light source 21, for transmitting data via light guide 29, component 32 may comprise an infrared light source and be directly coupled with light guide 29, similar to the coupling of component 31. Furthermore, also component 31 may comprise an infrared light source, and component 32 or illumination source 20 may comprise a detector like a photo diode to enable bidirectional communication between components 31 and 32. Moreover, the communication via light guides is not limited to two components as shown in FIG. 1B.

Figure 2:
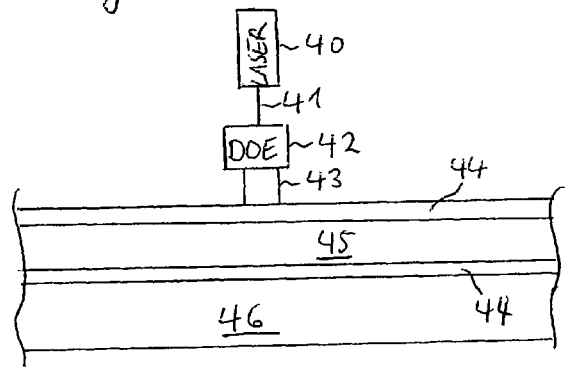
FIG. 2 is a schematic diagram of an operative according to an embodiment of the present invention.

Turning now to FIG. 2, an apparatus for modifying a light guide according to an embodiment of the present invention is shown. The apparatus shown in FIG. 2 may for example be used to provide locations 22 to 28 and 30 on light guide 29 of the embodiment of FIGS. 1A and 1B, but is not limited thereto and generally may serve to modify a light guide to let light escape at predetermined locations.

The apparatus of the embodiment of FIG. 2 comprises a laser 40, for example an ultraviolet (UV) laser, to emit a laser beam 41. Laser 40 may for example be a solid state laser or a gas laser, but is not limited thereto. In the embodiment shown in FIG. 2, laser beam 41 is directed at a diffractive optical element (DOE) 42 which modifies laser beam 41 to generate a modified beam 43. Modified beam 43 is then used to "write" on a light guide to provide locations where light may escape the light guide, like locations 22 to 28, 30 of FIG. 1B.

Diffractive optical element 42 may for example be a holographic DOE, an axicon, an acousto-optical module where a spatial modulation of index of refraction is achieved by acoustic waves running in a material, or a combination of one or more of such elements. Another example for a DOE is a Bragg grating. DOE 42 may for example be configured to provide a spatial modulation with a certain "jitter" or modulation period to the laser beam to "write" a repetitive diffraction pattern, for example an interference pattern, on a light guide.

It should be noted that to provide an easier understanding of the apparatus according to the embodiment of FIG. 2 conventional optical elements like lenses or mirrors which may serve for guiding the light beam 42 to DOE 42 and for focusing the laser have been omitted, but may be present in some embodiments.

As an example for a waveguide to be treated by the apparatus described above, in FIG. 2 a waveguide comprising a core 45 and a cladding 44 surrounding core 45 are shown. For example, cladding 44 may have a lower refractive index than core 45. In such a case, cladding 44 may be sensitive to light emitted by laser 40, while core 45 may be insensitive to the light emitted by the laser such that the laser only manipulates the cladding. For example, the laser may evaporate or otherwise remove portions of cladding 44 in a pattern determined by DOE 42. This pattern modifies the refractive index of cladding 44 and therefore modifies the angle of total reflection mentioned above. In such a case, for example light incident under an angle which may lead to total reflection in the unmodified light guide may partially leave the light guide at the modified portion, leading to illumination.

It should be noted that the light guide of FIG. 2 comprising core 45 and cladding 44 serves only as an example, and other structures, for example multilayer structures, planar structures or structures only having a single core which is then modified by a laser beam are possible.

In the example shown in FIG. 2, the light guide comprising core 45 and cladding 44 is coupled with a carrier 46. Carrier 46 may for example be a plastic piece to be inserted in a mobile device like mobile device 10 of FIG. 1B.

In such a case, during manufacture, in an embodiment first the light guide is coupled with the plastic part 46, then the light guide is modified for creating locations where light may escape the light guide, and then the plastic piece together with the light guide is inserted into the mobile device.

In such an embodiment, there may be relaxed requirements for the positioning of the light guide on the plastic part 46 if the creation of location is performed with respect to plastic part 46 such that the locations where light may escape are created at the correct locations even if the light guide itself is slightly misaligned. As a matter of course, instead of a plastic part 46 another part like a metal part or a part consisting of mixed materials may be used as a carrier. In other embodiments, no carrier is used, and the light guide is first modified and then inserted in position within a mobile device.

Figure 3:
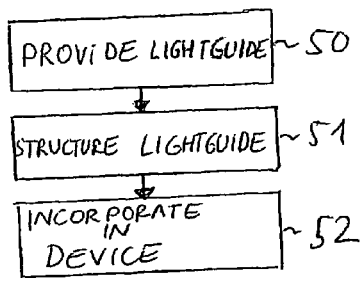
FIG. 3 is a flow diagram of a method according to an embodiment of the present invention.

In FIG. 3, a flow diagram is shown illustrating an embodiment of a method for manufacturing a mobile device. At 50, a light guide is provided, like for example the light guide shown in FIG. 2. The light guide may be provided together with a carrier as shown in FIG. 2 taking plastic part 46 as an example or may be provided separate from any carrier.

At 51, the light guide is structured, i.e. modified to create locations where light may exit the light guide. This may for example be done using the apparatus explained with reference to FIG. 2.

At 52, the light guide, possibly together with a carrier, is incorporated in the mobile device.

It should be noted that the various operations described with respect to FIG. 3 do not have to be performed in the order shown. For example, the incorporation in the mobile device may be performed before structuring the light guide, i.e. the light guide is structured when already incorporated in the device.

As can be seen from the above discussed modifications and variations of the embodiments shown in the drawings, a plurality of possibilities exists for implementing the present invention. Therefore, the scope of the present invention is not to be construed as being limited by the embodiments shown, but is construed to be limited only by the appended claims and equivalents thereof.

The invention claimed is:

1. A mobile device, comprising:
   at least one light source configured to emit light in the visible range,
   a light guide coupled to said light source configured to guide light emitted by said at least one light source through said mobile device,
   said light guide being modified at a plurality of locations to let at least part of the light guided within the light guide escape at said locations, wherein a first location of said plurality of locations is configured to let light of a different wavelength range escape from the light guide than a second location of said plurality of locations.

2. The mobile device of claim 1, further comprising a plurality of elements to be illuminated, wherein each element of said plurality of elements is associated with at least one location of said plurality of locations.

3. The mobile device of claim 2, wherein at least one element of said plurality of elements is selected from the group consisting of a key, a button, a joystick and an area of the mobile device.

4. The mobile device of claim 1, wherein said at least one light source comprises at least two light sources having different wavelengths.

5. The mobile device of claim 1, wherein said at least one light source comprises a light emitting diode.

6. The mobile device of claim 1, wherein said light guide comprises a material selected from the group consisting of a plastic material, a glass material and a material combining plastic and glass.

7. The mobile device of claim 1, wherein at least one location of said plurality of locations of said light guide comprises a modification, said modification being selected from the group consisting of a removal of material from an outer layer of the light guide, a removal of material of a core layer of the light guide, a modification of material according to a predetermined pattern and a removal of material according to a predetermined pattern.

8. The mobile device of claim 1, further comprising a light transmitter configured to couple light modulated depending on data to be transmitted into said light guide and a light receiver coupled to said light guide configured to receive said modulated light and demodulate said light to retrieve said data.

9. The mobile device of claim 8, wherein said modulated light has a wavelength in the infrared range.

10. The mobile device of claim 1, wherein said mobile device is selected from the group consisting of a mobile phone, a gaming device, a personal digital assistant, a laptop computer and a music player.

11. A method of manufacturing a mobile device, comprising:
    providing a light guide,
    structuring said light guide such that light guided in the light guide is allowed to escape the light guide at a plurality of predetermined locations, and
    incorporating the light guide in a mobile device,
    wherein the structuring step comprises irradiating said light guide with a laser beam.

12. The method of claim 11, wherein said providing a light guide comprises providing said light guide coupled with a carrier element, and wherein said incorporating said light guide in said mobile device comprises incorporating said light guide together with said carrier element in said mobile device.

13. An apparatus for manufacturing a mobile device, comprising:
    a laser,
    a diffractive optical element configured to receive a laser beam from said laser and to guide the laser beam over a light guide so as to create a plurality of locations in said light guide where light guided in said light guide may escape the light guide,
    wherein said light guide is to be incorporated into a mobile device for illuminating parts thereof.

14. The apparatus of claim 13, wherein said diffractive optical element is selected from the group consisting of a holographic diffractive optical element, an axicon, a Bragg grating and an acousto-optical module.

15. A mobile device, comprising:
    at least one light source configured to emit light in the visible range, a light guide coupled to said light source configured to guide light emitted by said at least one light source through said mobile device, wherein said light guide is modified at a plurality of locations to let at least part of the light guided within the light guide escape at said locations, and a light transmitter configured to couple light modulated depending on data to be transmitted into said light guide and a light receiver coupled to said light guide configured to receive said modulated light and demodulate said light to retrieve said data, the light guide, the light transmitter, and the light receiver configured to communicate with each other internally within the mobile device.

* * * * *